United States Patent
Hui et al.

(10) Patent No.: US 9,507,480 B1
(45) Date of Patent: Nov. 29, 2016

(54) INTERFACE OPTIMIZATION APPLICATION

(71) Applicant: Amazon Technologies, Inc., Reno, NV (US)

(72) Inventors: Allan Poon Hui, Redmond, WA (US); Douglas Andrew Hungarter, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 292 days.

(21) Appl. No.: 13/751,245

(22) Filed: Jan. 28, 2013

(51) Int. Cl.
*G06F 3/048* (2013.01)

(52) U.S. Cl.
CPC ..................................... *G06F 3/048* (2013.01)

(58) Field of Classification Search
CPC .. G06F 17/211; G06F 17/212; G06F 3/1251; G06T 2200/24
See application file for complete search history.

(56) References Cited

U.S. PATENT DOCUMENTS

| | | | | |
|---|---|---|---|---|
| 7,324,838 B2* | 1/2008 | Tarle | | 455/566 |
| 7,668,963 B1* | 2/2010 | Miner | | G06F 17/3089 709/231 |
| 7,895,522 B2* | 2/2011 | Wong et al. | | 715/746 |
| 8,667,387 B2* | 3/2014 | Sahota | | 715/234 |
| 8,793,584 B2* | 7/2014 | Chen et al. | | 715/733 |
| 2005/0076306 A1* | 4/2005 | Martin et al. | | 715/747 |
| 2005/0108692 A1* | 5/2005 | Lau | | G06F 8/76 717/136 |
| 2006/0248121 A1* | 11/2006 | Cacenco | | G06F 8/71 |
| 2008/0270911 A1* | 10/2008 | Dantwala | | G06Q 10/10 715/741 |
| 2008/0313650 A1* | 12/2008 | Arnquist et al. | | 719/316 |
| 2009/0172101 A1* | 7/2009 | Arthursson | | 709/205 |
| 2010/0043017 A1* | 2/2010 | Paul | | G06F 8/64 719/328 |
| 2011/0083069 A1* | 4/2011 | Paul et al. | | 715/234 |
| 2011/0185286 A1* | 7/2011 | Moyers et al. | | 715/752 |
| 2011/0214076 A1* | 9/2011 | Cui et al. | | 715/762 |
| 2012/0278725 A1* | 11/2012 | Gordon et al. | | 715/738 |
| 2012/0317504 A1* | 12/2012 | Patel | | G06F 9/4443 715/762 |
| 2013/0061151 A1* | 3/2013 | Perry | | 715/744 |
| 2013/0124969 A1* | 5/2013 | Schochler | | G06F 17/2247 715/234 |
| 2013/0241951 A1* | 9/2013 | Dickinson | | G06F 3/017 345/619 |
| 2014/0082512 A1* | 3/2014 | Neuert et al. | | 715/744 |
| 2014/0108969 A1* | 4/2014 | Joel et al. | | 715/760 |
| 2014/0157143 A1* | 6/2014 | Ronkainen et al. | | 715/744 |

\* cited by examiner

*Primary Examiner* — Jeffrey A Gaffin
*Assistant Examiner* — Mandrita Brahmachari
(74) *Attorney, Agent, or Firm* — Thomas | Horstemeyer, LLP (57) ABSTRACT

Disclosed are various embodiments for an interface optimization application. A user interface layout is matched with a known pattern. Based on the pattern, a template is selected. The template may be modified by a user. Transformations are applied to the layout such that the resulting layout embodies the template and any modifications.

25 Claims, 6 Drawing Sheets

INTERFACE OPTIMIZATION APPLICATION

BACKGROUND

Applications can be executed on a variety of distinct client devices. Problems arise when the application user interfaces are not optimized for the differing characteristics of the client devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

A version of an executable application may be executed on many client devices having different characteristics. For example, the client devices may have different display types. The displays may be distinct from each other with respect to resolutions, sizes, and orientations. As another example, the client devices may have different input devices, such as a keyboard, touch screen, stylus, mouse, game controller or other device. Additionally, client devices may be deployed in differing regions having distinct fonts, bandwidth capabilities, or other considerations.

Executable applications such as packaged executable applications allow for user interfaces to be encoded as layouts. Distinct layouts can be created for different device or display types. For example, an executable application may define distinct user interface layouts for portrait-oriented mobile phones, portrait-oriented tablets, and landscape-oriented tablets. The executable application will then render the interface corresponding to the current client device. If an application is rendered on a client device for which a user interface layout is not defined, a user interface layout is typically resized to fit the display. For example, if an executable application has a portrait-oriented mobile phone layout but not a portrait oriented tablet layout and is executed on a portrait-oriented tablet client device, the executable application will render the portrait-oriented mobile phone interface resized to fit the larger tablet display.

Resizing user interface layouts designed for other device types results in a poor experience for a user of a client device. Available space for user interface elements and lines of text may be inefficiently or ineffectively utilized. Input fields may not be formatted to optimally fit different character sets or fonts. Low resolution image assets may be rendered at a larger resolution, resulting in pixelated or blocky images.

An interface optimization application detects whether an executable application is optimized for a device type by determining if a user interface layout has been defined for that device type. If the executable application is not optimized for the device type, the interface optimization application selects a user interface template optimized for the device type. Transformations are applied to a defined user interface layout to create an optimized user interface layout based on the template. The executable application is then modified to include the optimized user interface layout. Additionally, the interface optimization application may facilitate the inclusion of optimized image assets or media codecs into the executable application.

In the following discussion, a general description of the system and its components is provided, followed by a discussion of the operation of the same.

Figure 1:
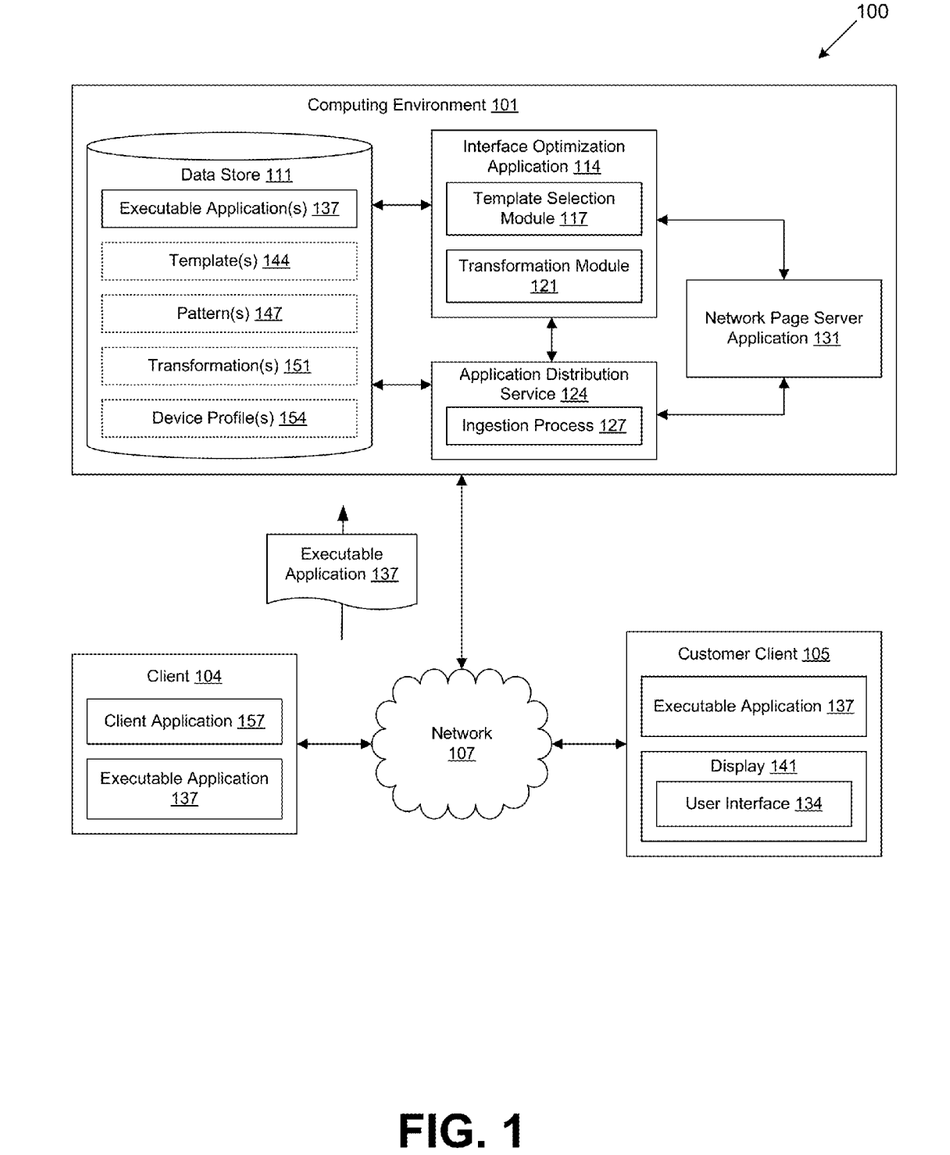
FIG. 1 is a drawing of a networked environment according to various embodiments of the present disclosure.

With reference to FIG. 1, shown is a networked environment 100 according to various embodiments. The networked environment 100 includes a computing environment 101, a client 104, and a customer client 105, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include an interface optimization application 114 having a template selection module 117 and transformation module 121, an application distribution service 124 having an ingestion process 127 and network page server application 131, and other applications, services, processes, systems, engines, or functionality not discussed in detail herein.

The interface optimization application 114 is executed to generate user interface 134 layouts 135 for an executable application 137 optimized for execution on a customer client 105. The executable application 137 comprises logic or functionality for execution on a customer client 105. The user interface 134 of the executable application 137 may be encoded as a layout 135 in Extensible Markup Language (XML) format or another format, programmatically generated by logic of the executable application 137, or by another approach To this end, the interface optimization application 114 may obtain an instance of an executable application 137 from a client 104 associated with a developer of the executable application 137. The interface optimization application 114 then determines if a user interface 134 layout 135 of the executable application 137 is optimized for a customer client 105. In some embodiments, this may comprise performing an analysis of data encoding the user interface 134. For example, the interface optimization application 114 may analyze a file system of a packaged executable application 137 to determine if layout 135 files corresponding to a display 141 size, orientation, or resolution of the customer client 105 are included. As another example, the interface optimization application 114 may analyze a layout 135 file to determine if tags or metadata associated with the customer client 105 display 141 are included.

In other embodiments, the interface optimization application 114 may analyze data encoding the user interface 134 to determine if components of the user interface 134 are optimized for a font or character set associated with a localization of the executable application 137. For example, the executable application 137 may be localized for the Chinese distribution market. The interface optimization application 114 may then determine if text input fields are proportioned or spaced for legible input of a Chinese character set.

In another embodiment, the interface optimization application 114 may analyze the encoding of the user interface 134 to determine if the user interface 134 renders image assets optimized for rendering by a display 141 of a customer client 105. For example, the interface optimization application 114 may determine if the same image asset is rendered for both a smaller, lower resolution display 141 and a larger, higher resolution display 141. Other approaches may also be used to determine if the executable application 137 is not optimized for characteristics of a customer client 105.

The template selection module 117 of the interface optimization application 114 generates a template 144 for a user interface 134 that is optimized for the customer client 105. The template 144 defines a format or structure to which a user interface 134 conforms. The template 144 may be encoded in XML or another format. To generate the template 144, the template selection module 117 matches at least one pattern 147 to the user interface 134 layout 135 of the executable application 137. The pattern 147 is associated with one or more templates 144.

In some embodiments, generating the template 144 performs loading a template 144 associated with a pattern 147 from a data store 111 or another source. In other embodiments, the template selection module 117 obtains from a client 104 a selection of one of a plurality of templates 144 associated with a pattern 147. For example, the template selection module 117 may encode and communicate to the client 104 via the network 107 a network page or other interface to facilitate a selection of one of the templates 144 associated with the pattern 147. Generating the template 144 may be facilitated by another approach.

Additionally, in some embodiments, the template selection module 117 may encode and communicate to the client 104 via the network 107 an interface to modify the generated template 144. For example, the template selection module 117 may encode a drag-and-drop graphical interface to allow a user of a client 104 to manipulate elements of the template 144. The template selection module 117 may then modify the generated template 144 to reflect the input to the interface. The template 144 may also be modified by another approach.

The transformation module 121 of the interface optimization application 114 applies one or more transformations 151 to the user interface 134 layout 135 to generate a user interface 134 layout 135 which conforms to the generated template 144 and optimized for the customer client 105. The transformations 151 comprise actions, functions, or modifications applications to a layout 135, such as XML transformations 151 or other functions.

In some embodiments, the transformation module 121 may also generate new image assets of the executable application 137. Generating new image assets may comprise applying resolution modification functions to the image assets, or obtaining new image assets from a client 104 via the network 107. The transformation module 121 also modifies the executable application 137 to include the optimized user interface 134 layout 135. This may comprise, for example, repackaging an executable application 137 to include optimized user interface 134 layouts 135. The transformation module 121 may also modify the executable application 137 to include optimized image assets, media codecs, or other components.

The application distribution service 124 facilitates the sale, purchase, rental, or distribution of executable applications 137 to customer clients 105. To this end, the application distribution service 124 may consummate financial transactions with the customer client 105, communicate executable applications 137 to the customer client 105 via the network 107, or implement other functionality. The functionality of the application distribution service 124 may be facilitated by encoding for rendering an interface, or encoding for rendering a network page communicated to the customer client 105 by the network page server application 131.

The application distribution service 124 implements an ingestion process 127 to obtain executable applications from clients 104 for distribution. This may comprise encoding a network page or interface for rendering by a client 104. The ingestion process 127 may communicate the obtained executable application 137 to the interface optimization application 114 prior to making the executable application 137 available for distribution by the application distribution service 124. Other processes may also be applied to the executable application 137 by the ingestion process 127.

The network page server application 131 encodes network pages for rendering by a client 104 or a customer client 105. For example, the network page server application 131 may encode a network page for rendering by a browser client application 157. The network page server application 131 may encode or serve network pages to facilitate operations of the interface optimization application 114 or the application distribution service 124. For example, the network page server application 131 may serve a network page to the client 104 to facilitate a selection of a template 144 from a plurality of templates 144. As another example, the network page server application 131 may serve a network page to the client 104 to facilitate modifying a selected template 144. As an additional example, the network page server application 131 may serve network pages to facilitate an upload of an executable application 137 to an ingestion process 127 of an application distribution service 124. The network page server application 131 may facilitate the operations of other functionality implemented in the computing environment 101, or serve network pages for another purpose.

The data stored in the data store 111 includes, for example, executable applications 137, templates 144, patterns 147, transformations 151, device profiles 154, and potentially other data. Device profiles 154 comprise data encoding characteristics of a customer client 105. Data included in a device profile 154 may include a display 141 orientation capability, a display 141 size, a display 141 resolution, input devices, hardware components, or data.

The client 104 and customer client 105 are representative of a plurality of client devices that may be coupled to the network 107. The client 104 and customer client 105 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The customer client 105 may include a display 141. The display 141 may comprise, for example, one or more devices such as liquid crystal display (LCD) displays, gas plasma-based flat panel displays, organic light emitting diode (OLED) displays, LCD projectors, or other types of display devices, etc.

The client 104 may be configured to execute various applications such as a client application 157, an executable application 137, and/or other applications. The client application 157 may be executed in a client 104, for example, to access network content served up by the computing environment 101 and/or other servers. To this end, the client application 157 may comprise, for example, a browser, a dedicated application, etc. The client 104 may be configured to execute applications beyond the client application 157 such as, for example, email applications, social networking applications, word processors, spreadsheets, and/or other applications.

The customer client 105 may be configured to execute various applications such as an executable application 137, thereby rendering a user interface 134 on the display 141, and other applications. The customer client 150 may be configured to execute applications beyond the executable application 137 such as, for example, email applications, social networking applications, word processors, spreadsheets, and/or other applications.

Next, a general description of the operation of the various components of the networked environment 100 is provided. To begin, a client 104 submits an executable application 137 to an application distribution service 124 via the network 107. In some embodiments, this is facilitated by a network page served by the network page server application 131 for rendering by a browser client application 157. In other embodiments, this is facilitated by a dedicated client application 157, a software development kit (SDK), or other application. The executable application 137 may also be submitted to the application distribution service 127 by another approach.

Next, the ingestion process 127 of the application distribution service 124 obtains the executable application 137 from the network 107 and queries the interface optimization application 114 to perform optimizations with respect to the obtained executable application 137. The interface optimization application 114 then determines if a user interface 134 layout 135 of the executable application 137 is optimized with respect to a customer client 105.

The determination may be facilitated by comparing elements or data of the executable application 137 to a device profile 154. In some embodiments, the device profile 154 may be encoded in a catalog of device profiles 154 of customer clients 105 stored in a data store 111 or another source. Additionally, in some embodiments the device profiles 154 may be representative of product listings or product pages, and the catalog of may be accessible to an electronic commerce system or other functionality implemented in the computing environment 101.

In some embodiments, determining if the executable application 137 is optimized with respect to a customer client 105 comprises determining if the executable application 137 comprises a user interface 134 layout 135 is designed for rendering by a display 141 of the customer client 105. This may comprise determining if a layout 135 file comprises tags or metadata associated with one or more of an orientation, resolution, size, or other characteristic of the display 141. Determining if the executable application is optimized with respect to a customer client 105 may also be performed by another approach.

If the executable application 137 is optimized with respect to a customer client 105 the ingestion process 127 may then make the executable application 137 available for distribution by the application distribution service 124 by storing an instance of the executable application 137 in a data store 111 accessible to the application distribution service 124, or by another approach. In other embodiments, the ingestion process 127 may query other functionality implemented in the computing environment 101 prior to making the executable application 137 available for distribution by the application distribution service 124.

If the executable application 137 is not optimized with respect to a customer client 105 the template selection module 117 matches a pattern 147 to the layout 135 of the user interface 134. This may comprise applying an XML pattern 147 matching function to the layout 135, or by another approach. Next, the template selection module 117 generates at least one template 144 that is optimized for the customer client 105 as a function of at least the pattern 147.

In some embodiments, generating the template 144 as a function of the pattern 147 may comprise generating a collection of those templates 144 selected with respect to other executable applications 137 during previous optimizations performed by the interface optimization application 114. For example, the template selection module 117 may select a number of the most frequently selected templates 144 applied to other executable applications 137 whose patterns 147 were identical or similar to that of the current executable application. As another example, the template selection module 117 may select those templates 144 having the highest ratings or reviews submitted by developers of previously optimized executable applications 137. Templates 144 may also be generated as a function of the pattern 147 by another approach.

In some embodiments, the template 144 may be generated as a function of a localization of the executable application 137. For example, the template selection module 117 may generate a selection of templates 144 whose user interface 134 input fields are proportioned to accept character sets or fonts used in regions in which the executable application will be distributed. The template 144 may also be generated as a function of a localization by another approach.

The template 144 may also be generated as a function of metadata associated with the executable application 137. Metadata may include data representative of a target audience, content rating, keywords, application type, feature set, or other data. For example, the template selection module 117 may generate a selection of templates 144 having larger user interface 134 elements such as text or buttons to make the executable application 137 easier to use by a younger target audience. As another example, for an executable application 137 having a mature content rating, the template selection module 117 may generate a selection of templates 144 having a denser layout 135 or smaller text fonts to account for a more experienced user. The templates 144 may also be generated by another approach.

In some embodiments, generating the template 144 comprises generating more than one template 144, and obtaining a selection of one of the generated templates 144 from a client 104. To this end, the template selection module 117 may encode a network page or other interface to facilitate a selection of one of the generated templates 144 for rendering by a client 104. For example, the template selection module 117 may encode a network page served by the network page server application 131, or encode an interface for rendering by a dedicated client application 157. In these embodiments, the template selection module 117 then obtains a selection of one of the generated templates 144 from the client 104.

In some embodiments, generating the template 144, the template selection module 117 may encode an interface for modifying the generated template 144. The interface may be encoded in a network page served by the network page server application 131 or as data rendered by a dedicated client application 157. For example, the template selection module 117 may encode an interface rendering a drag-and-drop interface to manipulate placement, sizing, or other features of template 144 components. In such an embodiment, the template selection module 117 then modifies the template 144 to reflect the modifications made by the client 104.

Next, the transformation module 121 applies one or more transformations 151 to the layout 135 of the executable application 137 to generate an optimized layout 135 embodying the generated template 144 or the modified template 144. This may comprise, for example, applying one or more XML transformations 151 to an XML layout 135. In some embodiments, the transformation module 121 dynamically determines the transformations 151 to be applied. In other embodiments, the template 144 and pattern 147 are associated with a predefined collection of transformations 151, for example in a relational database or other data structure. Other approaches may also be used to apply transformations 151 to the layout of the executable application 135 to generate the optimized layout 135.

Next, in some embodiments, the transformation module 121 may obtain additional data or elements to be included in an optimized instance of the executable application 137. For example, in some embodiments the interface optimization application 114 may determine that image assets of the executable application 137 are not optimized for rendering on the customer client 105. In such an embodiment, the transformation module 121 may encode an interface to facilitate an upload of optimized image assets by the client 104. For example, the transformation module 121 may encode the interface as a network page served by the network page server application 131, as data rendered by a dedicated client application 157, or by another approach. In some embodiments, the transformation module 121 my apply image resolution modification functions to the image assets to generate optimized image assets.

In other embodiments, the transformation module 121 may obtain media codecs, fonts, or character sets for inclusion in the executable application 137. For example, the transformation module 121 may generate or obtain a streaming video codec for inclusion in the executable application 137 for distribution of the executable application 137 in a region having low network 107 bandwidth. As another example, the transformation module 121 may include a font in the executable application 137 as a function of a localization of the executable application 137. Additional data or elements may also be obtained by another approach.

In embodiments in which additional data or components are obtained for inclusion in an optimized instance of the executable application, the transformation module 121 may modify references or other data of the layout 135 to render the additional content in the user interface 134.

Next, the transformation module 121 generates an optimized instance of the executable application 137 to comprise the optimized user interface 134 layout 135 and additionally obtained components or data. This may comprise, for example, repackaging a packaged executable application 137 such that the optimized layout 135 and any additional data are included in the executable application 137 file system. In other embodiments, this comprises recompiling the executable application 137. The optimized instance of the executable application 137 may also be generated by another approach.

After the optimized instance of the executable application 137 has been generated, the interface optimization application 114 may then query the ingestion process 127 to proceed with additional functions applied to the executable application, or to make the optimized instance of the executable application 137 available for distribution in the application distribution service 124.

Figure 2A:
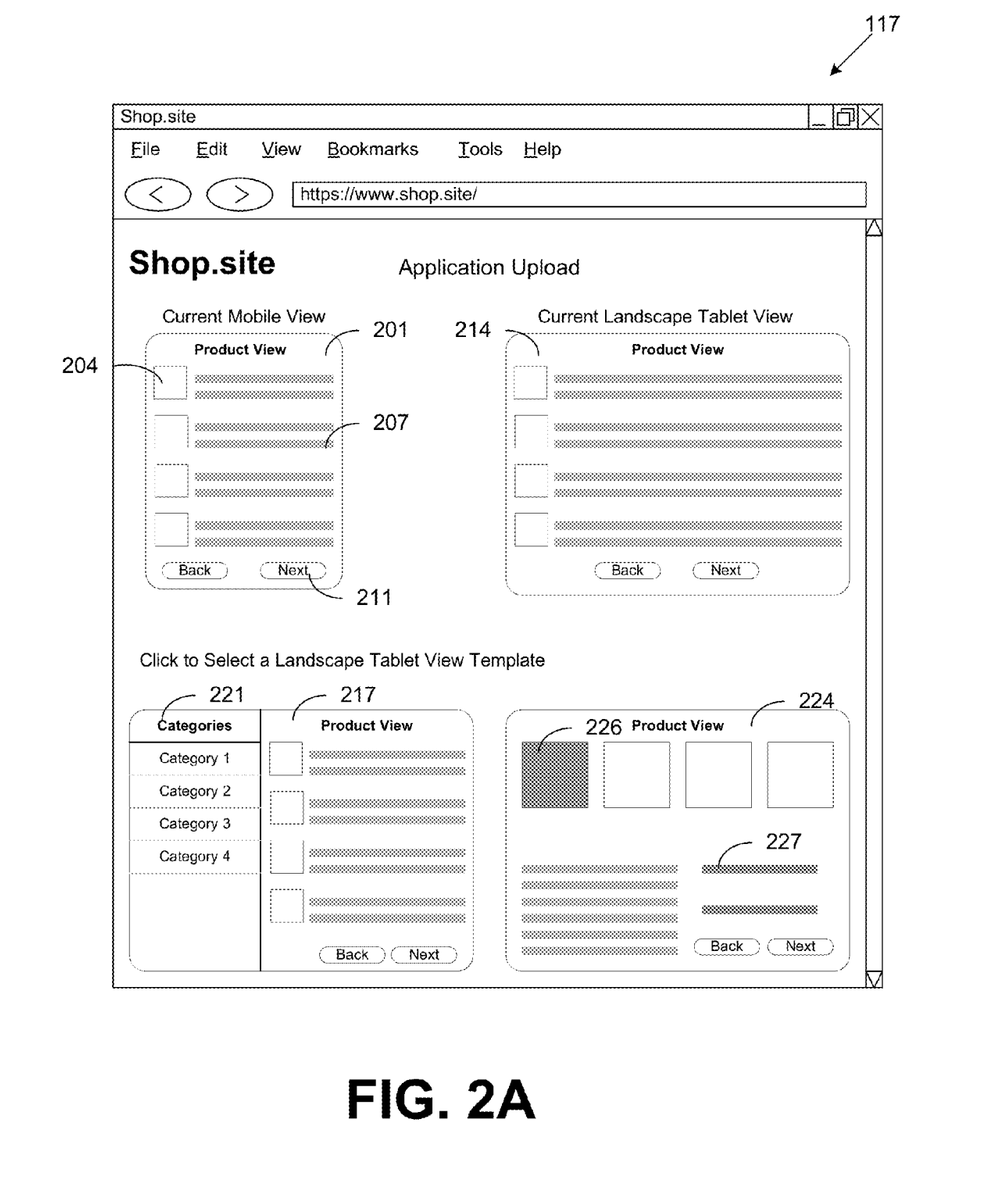
FIGS. 2A, 2B, and 2C are drawings of an example of a user interface rendered by a client in the networked environment of FIG. 1 according to various embodiments of the present disclosure.

Referring next to FIG. 2A, shown is an example user interface encoded by the template selection module 117 (FIG. 1) of the interface optimization application 114 (FIG. 1) for rendering by a client 104 (FIG. 1). FIG. 2A depicts an interface to facilitate a selection of a template 144 (FIG. 1) for an optimized layout 135 (FIG. 1) of an executable application 137 (FIG. 1) to embody. FIG. 2A may be representative of a network page served by a network page server application 131 (FIG. 1) rendered by a browser client application 157 (FIG. 1) or an interface rendered by a dedicated client application 157.

Item 201 is a visual representation of a layout 135 for a product view user interface 134 (FIG. 1) designed for rendering on a display 141 (FIG. 1) of a mobile customer client 105 (FIG. 1). Item 204 is an image placeholder for dynamically populated product images, and item 207 is text placeholder for dynamically populated product descriptions. Item 211 is a button for navigation through a workflow of the executable application 137.

Item 214 is a visual representation of a layout 135 for a product view user interface 134 as rendered by a tablet customer client 105 in landscape orientation. The image placeholders of item 204 maintain the same column orientation, while the text placeholders of item 207 have been stretched to account for a wider aspect ratio. The buttons of item 211 maintain a centered placement.

Item 214 is a visual representation of the layout 135 transformed to embody a first template 144. Items 204, 207, and 211 maintain similar placement as in item 201. Item 221 is an item category menu which has been added to the layout 135 to fill the wider aspect ratio.

Item 224 is a visual representation of the layout 135 transformed to embody a second template 144. Item 204 has been transformed such that the product images are in a row orientation. Item 226 is an image placeholder for a focused one of the products. Item 207 is been modified to be filled with a product description of the product focused on by item 226. Item 227 is an additional text placeholder for product data. Item 211 has been transformed to be in a lower right placement.

In this embodiment, items 217 and 224 are clickable visual representations which, when clicked upon, select a template 144 and initiate a furthering of a workflow of the interface optimization application 114. A template 144 may be selected by another approach, as well.

Figure 2B:
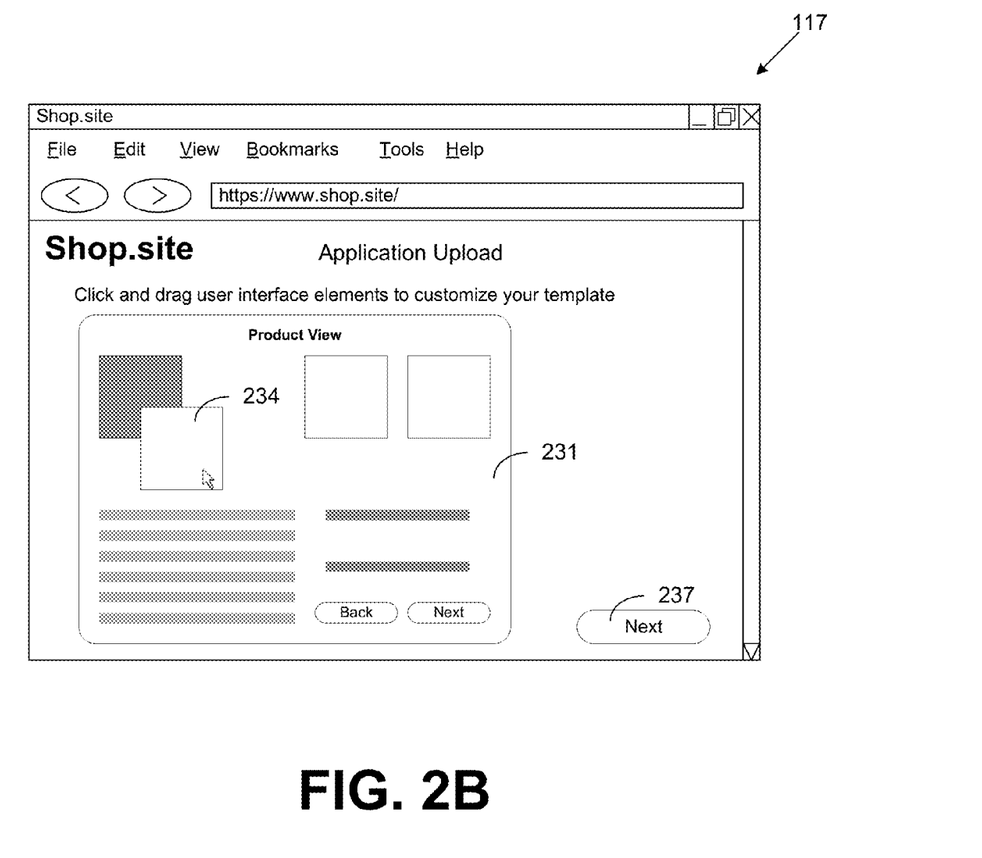

Turning now to FIG. 2B, shown is an example user interface encoded by the template selection module 117 (FIG. 1) of the interface optimization application 114 (FIG. 1) for rendering by a client 104 (FIG. 1). FIG. 2B depicts a drag-and-drop interface to facilitate a manipulation of a selected template 144 (FIG. 1) for an optimized layout 135 (FIG. 1) of an executable application 137 (FIG. 1) to embody. Item 321 is a visual representation of the layout 135 for a product view screen transformed to embody a selected template 144. Item 234 is an image placeholder being clicked and dragged to a new location within item 231. Item 237 is a button which, upon clicking, manipulates the selected template 144 to reflect the modifications, and then proceeds to a next step in the workflow of the interface optimization application 114.

Figure 2C:
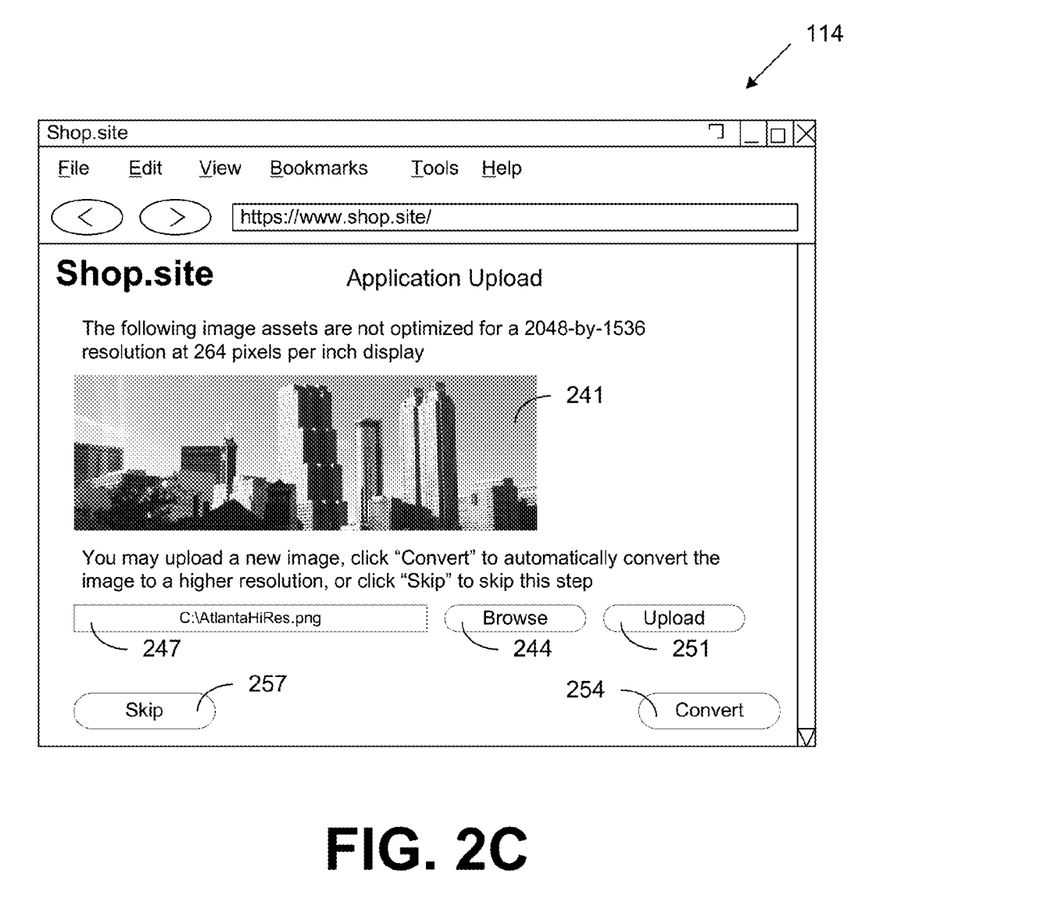

Moving on to FIG. 2C, shown is an example user interface encoded by interface optimization application 114 (FIG. 1) for rendering by a client 104 (FIG. 1). FIG. 2C depicts an interface to optimize image assets of an executable application 137 (FIG. 1) by either uploading new image assets or automatically converting the existing image assets to an optimized resolution. Item 241 is a rendering of the image asset to be optimized. Item 244 is a button which, when pressed opens up a file selection window to facilitate a selection of a new image asset by a client 104. Item 247 represents an input field for inputting a file path to a new image asset, which may be automatically populated upon selecting a file using item 244. Item 251 is a button which initiates an upload of the file indicated by item 247. Item 257 initiates an automatic resolution increase of the existing asset performed by the transformation module 121 (FIG. 1). Item 257 is a button which proceeds to a next step in the workflow of the interface optimization application 114 without optimizing the image asset rendered as item 241.

Figure 3:
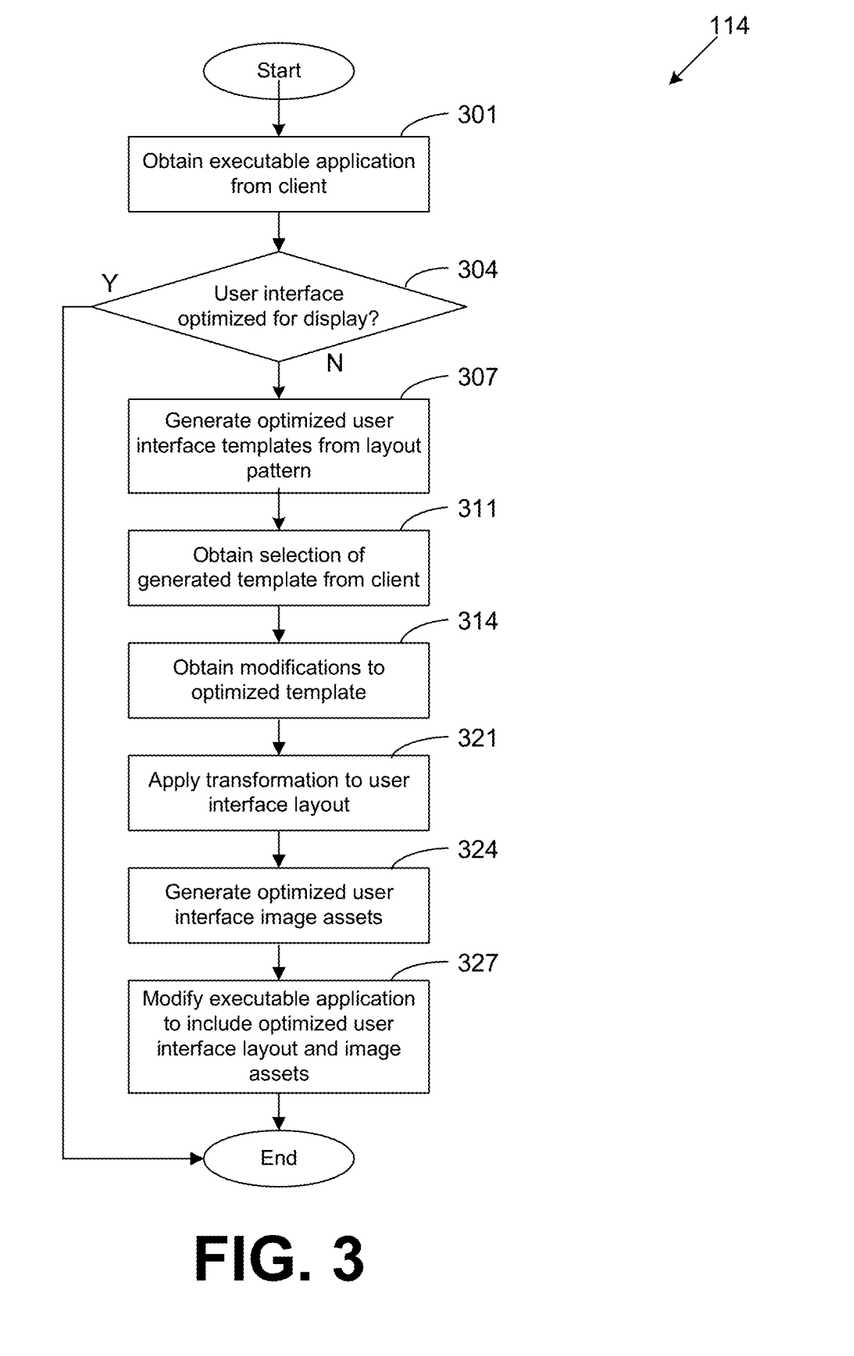
FIG. 3 is a flowchart illustrating one example of functionality implemented as portions of an interface optimization application executed in a computing environment in the networked environment of FIG. 1 according to various embodiments of the present disclosure.

Referring next to FIG. 3, shown is a flowchart that provides one example of the operation of a portion of the interface optimization application 114 (FIG. 1) according to various embodiments. It is understood that the flowchart of FIG. 3 provides merely an example of the many different types of functional arrangements that may be employed to implement the operation of the portion of the interface optimization application 114 as described herein. As an alternative, the flowchart of FIG. 3 may be viewed as depicting an example of steps of a method implemented in the computing environment 101 (FIG. 3) according to one or more embodiments.

Beginning with box 301, the interface optimization application 114 obtains an executable application 137 (FIG. 1) from a client 104 (FIG. 1). This may comprise a client 104 submitting the executable application to an application distribution system 124 (FIG. 1) whose ingestion process 127 (FIG. 1) queries the interface optimization application 114, by a client submitting the executable application 137 to the interface optimization application 114 via a web service or exposed application program interface, or by another approach.

In box 304 the interface optimization application 114 determines if a user interface 134 (FIG. 1) of the executable application 137 is optimized for a display 141 (FIG. 1) of a customer client 105 (FIG. 1). This may comprise analyzing the contents of a layout 135 (FIG. 1) to determine if the layout 135 comprises tags or metadata indicating for which display 141 types the executable application 137 is developed and comparing that to a display 141 of the customer client 105.

The comparison may be made against a listing of general display 141 types, such as a general tablet landscape or portrait display 141, or made against a specific display 141 implemented in a defined customer client 105. For example, the interface optimization application 114 may load a device profile 154 (FIG. 1) corresponding to the customer client 105 from a data store 111 (FIG. 1) or query a product catalog of an electronic commerce system to generate a device profile 154 to make the comparison. Determining if a user interface 134 of the executable application 137 is optimized for a display 141 of a customer client 105 may also be performed by another approach.

Next, in box 307, the template selection module 117 (FIG. 1) of the interface optimization application 114 generates a collection of templates 144 (FIG. 1) for user interfaces 134 optimized for the customer client 105 as a function of a layout 135 pattern 147. In some embodiments, this comprises matching one of a plurality of predefined patterns 147 to a layout 135 file embodying the user interface 134. For example, the template selection module 117 may apply an XML pattern 147 matching function to the a layout 135 file encoded in XML. The collection of templates 144 is then generated to comprise those templates 144 associated with the pattern 147.

In box 311, the template selection module 117 then obtains a selection of one of the generated templates 144 from the client 104. This may comprise encoding for rendering by the client 104 an interface facilitate the selection. For example, the template selection module 117 may encode a network page that is served by a network page server application 131 (FIG. 1) and communicated to the client 104 via the network 107 (FIG. 1). The template selection module may also encode the interface as data for rendering by a dedicated client application 157 (FIG. 1). Input to the interface is then communicated by the client 104 to the template selection module 117.

Next, in box 314, the template selection module 117 then obtains one or more modifications to the selected template 144 from the client 104. This may comprise encoding for rendering by the client 104 an interface facilitate modification of the template 144. The interface may comprise a drag-and-drop interface for moving, resizing, or otherwise modifying elements of the template. The interface may also comprise other data. For example, the template selection module 117 may encode a network page that is served by a network page server application 131 (FIG. 1) and communicated to the client 104 via the network 107 (FIG. 1). The template selection module may also encode the interface as data for rendering by a dedicated client application 157 (FIG. 1). Input to the interface is then communicated by the client 104 to the template selection module 117, which then modifies the selected template 144 to reflect the modifications.

Next, in box 321, the transformation module 121 (FIG. 1) applies transformations 151 to the layout 135 of the user interface 134 such that the resulting optimized layout 135 embodies the modified template 144. For example, the transformation module 121 may apply XML transformations 151 to the layout 135, or by another approach. The transformations 151 may be dynamically generated as a function of the pattern 147 and modified template 144, loaded as predefined transformations 151 from a data store 111, or by another approach.

Proceeding to box 324, the interface optimization application 114 then generates optimized image assets for the executable application. This may comprise encoding for rendering by the client 104 an interface to facilitate the an upload of image assets by a client 104. For example, the template selection module 117 may encode a network page that is served by a network page server application 131 (FIG. 1) and communicated to the client 104 via the network 107 (FIG. 1). The template selection module may also encode the interface as data for rendering by a dedicated client application 157 (FIG. 1). An image asset referenced as input to the interface is then communicated by the client 104 to the interface optimization application 114.

In other embodiments, the transformation module 121 applies a resolution modification function to an existing image asset to generate an image asset optimized for the display 141 of the customer client 105. For example, the transformation module 121 may apply a compression or up-res function to an existing image asset. The transformation module 121 may then modify the optimized layout 135 to reference or otherwise render the optimized image assets.

In box 237, the transformation module 121 modifies the executable application to include the optimized user interface 134 layout 135 and image assets. This may comprise repackaging a packaged executable application 137 whose file system includes an optimized layout 135 file and image assets, recompiling the executable application 137, or some other approach. Next, the process ends.

Figure 4:
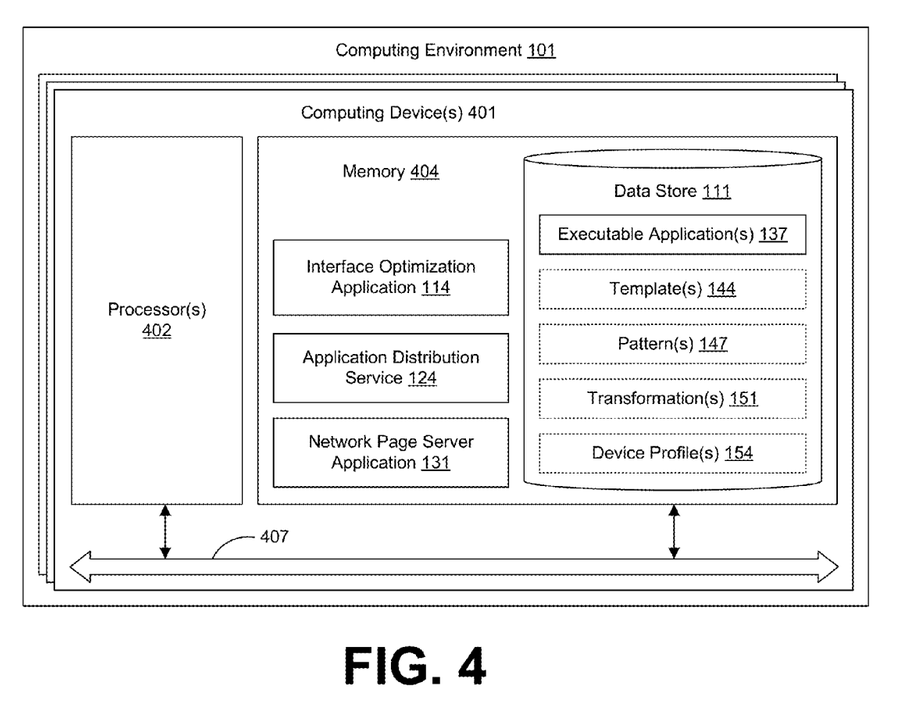
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 101 according to an embodiment of the present disclosure. The computing environment 101 includes one or more computing devices 401. Each computing device 401 includes at least one processor circuit, for example, having a processor 402 and a memory 404, both of which are coupled to a local interface 407. To this end, each computing device 401 may comprise, for example, at least one server computer or like device. The local interface 407 may comprise, for example, a data bus with an accompanying address/control bus or other bus structure as can be appreciated.

Stored in the memory 404 are both data and several components that are executable by the processor 402. In particular, stored in the memory 404 and executable by the processor 402 are an image optimization application 114 (FIG. 1), an application distribution service 124 (FIG. 1), a network page server application 131 (FIG. 1) and potentially other applications. Also stored in the memory 404 may be a data store 111 having executable applications 137 (FIG. 1), templates 144 (FIG. 1), patterns 147 (FIG. 1), transformations 151 (FIG. 1) and device profiles 154 (FIG. 1) and other data. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc. The local interface 407 may comprise additional systems designed to coordinate this communication, including, for example, performing load balancing. The processor 402 may be of electrical or of some other available construction.

Although the interface optimization application 114, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIG. 3 shows the functionality and operation of an implementation of portions of the interface optimization application 114. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the interface optimization application 114, that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed, causing the at least one computing device to at least:
   obtain, from a client device, a packaged executable application comprising at least one user interface layout optimized for a first display type, the at least one user interface layout being encoded in Extensible Markup Language (XML);
   determine, as a function of the at least one user interface layout, if the packaged executable application is unoptimized, based at least in part on a predefined condition, for a second display type distinct from the first display type;
   apply, responsive to the packaged executable application being unoptimized for the second display type, an XML pattern matching function to an XML encoding of the at least one user interface layout to match the at least one user interface layout with at least one XML pattern;
   select a plurality of optimized user interface templates as a function of the at least one XML pattern;
   obtain, from the client device, a selection of a one of the optimized user interface templates;
   encode for rendering by the client device a user interface to facilitate a modification of the selected one of the optimized user interface templates, the modification generating a modified optimized user interface template;
   apply at least one XML transformation to the at least one user interface layout as a function of at least one of the selected one of the optimized user interface templates or the modified optimized user interface template, generating an optimized user interface layout, the optimized user interface layout conforming to the selected one of the optimized user interface templates or the modified optimized user interface template; and
   generate an optimized executable application by repackaging the executable application to further comprise the optimized user interface layout.

2. The non-transitory computer-readable medium of claim 1, wherein the program, when executed, further causes the at least one computing device to add the optimized executable application to a catalog of executable applications accessible to an application distribution system.

3. The non-transitory computer-readable medium of claim 1, wherein the at least one user interface layout is configured to render an image asset, and the program, when executed, further causes the at least one computing device to at least:
   obtain, from the client device, an optimized image asset optimized for the second display type; and
   wherein generating the optimized executable application comprises repackaging the executable application to further comprise the optimized image asset.

4. A system, comprising:
   at least one computing device
   configured to at least:
      determine whether an executable application is unoptimized for execution by a client device based at least in part on a predefined criterion, the executable application comprising at least one user interface layout;

apply an Extensible Markup Language (XML) pattern matching function to an XML encoding of the at least one user interface layout to match the at least one user interface layout to at least one XML pattern;

generate, responsive to the executable application being unoptimized, at least one optimized user interface template based at least in part on the at least one XML pattern;

generate an optimized user interface layout conforming to the optimized user interface template by applying at least one transformation to the at least one user interface layout; and modify the executable application to include the optimized user interface layout.

5. The system of claim 4, wherein the client device is a first client device, and the at least one computing device is further configured to at least obtain the executable application from a second client device.

6. The system of claim 4, wherein the executable application is a packaged application, and modifying the executable application comprises generating a new packaged application comprising the optimized user interface layout.

7. The system of claim 4, wherein the optimized user interface template is one of a plurality of optimized user interface templates, and the at least one computing device is further configured to at least:

obtain a selection of one of the optimized user interface templates; and wherein the optimized user interface layout conforms to the selected one of the optimized user interface templates.

8. The system of claim 4, wherein the client device is a first client device, and wherein the at least one computing device is further configured to at least:

encode for rendering by a second client device a user interface to modify the optimized user interface template;

obtain a modification to the optimized user interface template from the second client device; and wherein the optimized user interface layout further conforms to the modification.

9. The system of claim 4, wherein determining whether the executable application is unoptimized for execution by the client device comprises:

determining whether the at least one user interface layout corresponds to at least one of a display resolution, display orientation, display size, or input device type distinct from that of the client device; and wherein the executable application is unoptimized responsive to the determination.

10. The system of claim 4, wherein the executable application renders an image asset, and the at least one computing device is further configured to at least:

obtain an optimized image asset; and modify the executable application to render the optimized image asset.

11. The system of claim 9, wherein determining whether the executable application is unoptimized for execution by the client device comprises:

obtaining a client device profile corresponding to the client device; and wherein the determination is performed as a function of the client device profile.

12. The system of claim 4, wherein determining whether the executable application is unoptimized for execution by the client device further comprises:

determining whether the at least one user interface layout corresponds to a localization associated with a distribution region of the executable application; and wherein the executable application is unoptimized responsive to the determination.

13. The system of claim 4, wherein determining whether the executable application is unoptimized for execution by the client device comprises:

determining whether the at least one user interface layout corresponds to at least one of a distribution region localization, a content rating a target audience, a keyword set, an application type, or a feature set of the executable application; and wherein the executable application is unoptimized responsive to the determination.

14. The system of claim 4, wherein the at least one user interface layout is configured to render an image asset having a first resolution, and the at least one computing device is further configured to at least:

generate an optimized image asset having a second resolution distinct from the first resolution;

wherein the optimized user interface layout is configured to render the optimized image asset; and wherein the determining whether the executable application is unoptimized is performed as a function of the image asset.

15. A method, comprising:

obtaining, in a computing device, an executable application comprising at least one user interface layout optimized for a first display type;

determining, in the computing device, if the executable application is unoptimized, based at least in part on a predefined criterion, for a second display type distinct from the first display type;

apply, in the computing device, responsive to the executable application being unoptimized for the second display type, an Extensible Markup Language (XML) pattern matching function to an XML encoding of the at least one user interface layout to match the at least one user interface layout to at least one XML pattern;

selecting, in the computing device, at least one optimized user interface template as a function of the XML pattern;

generating, in the computing device, an optimized user interface layout conforming to at least the optimized user interface template by applying at least one transformation to the at least one user interface layout; and modifying, in the computing device, the executable application to further comprise the optimized user interface layout, generating an optimized executable application.

16. The method of claim 15, wherein the optimized user interface template is one of a plurality of optimized user interface templates, and the method further comprising:

obtaining, in the computing device, a selection of one of the optimized user interface templates; and wherein the optimized user interface layout is generated to conform to the selected one of the optimized user interface templates.

17. The method of claim 15, wherein the generating the optimized user interface layout further comprises applying, in the computing device, an XML transformation to the user interface layout.

18. The method of claim 15, wherein the user interface layout is configured to render an image asset, and the method further comprising:

obtaining, in the computing device, responsive to the determining, an optimized image asset;

wherein the optimized user interface layout is configured to render the optimized image asset; and wherein the determining is performed as a function of the image asset.

19. The method of claim 15, wherein the at least one user interface layout is configured to render an image asset having a first resolution, and the method further comprising:

generating, in the computing device, responsive to the determining, an optimized image asset having a second resolution distinct from the first resolution;

wherein the optimized user interface layout is configured to render the optimized image asset; and wherein the determining is performed as a function of the image asset.

20. The method of claim 15, wherein the executable application is a first one of a plurality of executable applications, and wherein selecting the at least one optimized user interface template is performed as a function of an optimization performed with respect to a second one of the executable applications matching the XML pattern.

21. The method of claim 15, wherein the executable application comprises streaming media functionality facilitated by a first codec, and the method further comprises:

determining, in the computing device, a bandwidth capability associated with a distribution region of the executable application;

selecting, in the computing device, a second codec as a function of the bandwidth capability; and modifying, in the computing device, the streaming media functionality to be facilitated by the second codec.

22. The method of claim 15, wherein the method further comprises:

determining, in the computing device, whether the at least one user interface layout is unoptimized with respect to application metadata comprising least one of a content rating, a target audience, or an application type of the executable application; and wherein the step of matching is further performed responsive to the application being unoptimized with respect to the application metadata.

23. The method of claim 15, further comprising the step of adding, in the computing device, the optimized executable application to a catalog of executable applications accessible to an application distribution system.

24. The method of claim 15, wherein the executable application and the optimized executable application are packaged applications, and wherein modifying the executable application comprises repackaging the executable application to include at least the optimized user interface layout.

25. The method of claim 15, wherein determining if the executable application is unoptimized is based at least on part on a display resolution, display orientation, display size, or input device type.

* * * * *